United States Patent
Brncic et al.

(10) Patent No.: US 10,243,351 B2
(45) Date of Patent: Mar. 26, 2019

(54) METHOD AND CONTROL DEVICE FOR CURRENT DIFFERENTIAL PROTECTION

(71) Applicant: ABB Schweiz AG, Baden (CH)

(72) Inventors: Ivo Brncic, Västerås (SE); Zhanpeng Shi, Västerås (SE); Sören Forsman, Västerås (SE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/780,524

(22) PCT Filed: Jan. 27, 2016

(86) PCT No.: PCT/EP2016/051622
§ 371 (c)(1),
(2) Date: May 31, 2018

(87) PCT Pub. No.: WO2017/129233
PCT Pub. Date: Aug. 3, 2017

(65) Prior Publication Data
US 2018/0358802 A1    Dec. 13, 2018

(51) Int. Cl.
*H02H 7/045*    (2006.01)
*H02H 3/28*    (2006.01)
(Continued)

(52) U.S. Cl.
CPC ........ *H02H 7/0455* (2013.01); *H02H 1/0092* (2013.01); *H02H 3/283* (2013.01); *H02H 7/045* (2013.01); *H02H 3/006* (2013.01)

(58) Field of Classification Search
CPC .............................. H02H 7/045; H02H 7/0455
See application file for complete search history.

(56) References Cited

U.S. PATENT DOCUMENTS 6,442,010 B1 *  8/2002  Kasztenny ............ H02H 3/283
                                                            361/63
8,278,882 B2   10/2012  Gotou et al.
(Continued)

FOREIGN PATENT DOCUMENTS

CN    103986132 A    8/2014
CN    104852354 A    8/2015
(Continued)

OTHER PUBLICATIONS

International Search Report and Written Opinion of the International Searching Authority Application No. PCT/EP2016/051622 Completed: Oct. 4, 2016; dated Oct. 11, 2016 11pages.

*Primary Examiner* — Ronald W Leja
*Assistant Examiner* — Christopher J Clark
(74) *Attorney, Agent, or Firm* — Whitmyer IP Group LLC

(57) ABSTRACT

A method of current differential protection performed in a control device is disclosed, wherein the control device has a first operate-restrain characteristic with a differential characteristic pick-up setting $I_D$. The method includes: determining currents of all terminals of a protected object; determining a differential current based on the determined currents; determining direct current, DC, components in the respective determined currents; detecting a fault; and adjusting, for a detected external fault, the operate-restrain characteristics by setting an adjusted differential characteristic pick-up setting $I_{D\_adj}$ to be equal to the sum of the differential characteristic pick-up setting $I_D$ and the determined DC components, providing an adapted operate-restrain characteristics. Corresponding control device, computer program and computer program product are also disclosed.

17 Claims, 6 Drawing Sheets

(51) Int. Cl.
*H02H 1/00* (2006.01)
*H02H 3/00* (2006.01)

(56) References Cited

U.S. PATENT DOCUMENTS

| | | | |
|---|---|---|---|
| 2002/0060562 A1* | 5/2002 | Carrillo | H02H 3/283 |
| | | | 324/76.52 |
| 2004/0027748 A1* | 2/2004 | Kojovic | H02H 3/28 |
| | | | 361/62 |
| 2008/0130179 A1* | 6/2008 | Gajic | H02H 7/045 |
| | | | 361/36 |
| 2009/0009181 A1* | 1/2009 | Gangadharan | H02H 3/286 |
| | | | 324/522 |
| 2012/0182657 A1* | 7/2012 | Narendra | H02H 3/305 |
| | | | 361/87 |
| 2016/0006240 A1* | 1/2016 | Li | H02H 3/28 |
| | | | 361/93.1 |
| 2018/0145505 A1* | 5/2018 | Li | G01R 31/08 |

FOREIGN PATENT DOCUMENTS

| | | |
|---|---|---|
| EP | 2012402 A2 | 1/2009 |
| FR | 2969845 A1 | 6/2012 |
| JP | 5443545 A | 4/1979 |
| WO | 2008025309 A1 | 3/2008 |
| WO | 2014166027 A1 | 10/2014 |

* cited by examiner

METHOD AND CONTROL DEVICE FOR CURRENT DIFFERENTIAL PROTECTION

TECHNICAL FIELD

The technology disclosed herein relates generally to the field of protection in electrical power systems, and in particular to a method and control device for current differential protection.

BACKGROUND

Current differential protection is a reliable and widely used method for protection in electrical power systems. It is based on the idea of measuring currents on both sides of a protected zone or both sides of a protected object and calculating the difference between them, giving a differential current. The currents are typically measured by means of current transformers (CTs). A protected object or zone may be any part of the power system, for example a transmission line, transformer, generator, or a busbar.

FIG. 1 is a graph showing typical operate-restrained characteristics of the current differential protection. The differential current $I_{DIFF}$ (y-axis) may differ from (expected) zero even when there is no internal fault, e.g. due to current transformer errors. In common for most implementations is that an operate signal (trip command) is given when the differential signal is above a set pick-up value, which is a differential characteristic pick-up setting that accounts for errors causing false differential currents. That is, the set pick-up value is used for securing against false differential currents, thereby not restraining the protected object unnecessarily.

The differential current $I_D$ (y-axis), also denoted operating current, operation level, or operating point, is a function of a bias current $I_{BIAS}$ (x-axis) (also denoted restraining current). The restraint characteristic is a measure on amount of current that a protection relay, that implements the current differential protection, will use to restrain the protected object. The amount of current is based on the currents measured at the respective CT locations. Basically, as long as the differential current is lower than the differential characteristic pick-up value (i.e. lies in the area denoted Restraint region in FIG. 1) the power system is operational, and if the differential current is higher than the differential characteristic pick-up value (i.e. lies in the area denoted Operate region in FIG. 1) then circuit breakers should be tripped (opened) for avoiding damaging the object protected by the current differential protection.

The operate-restrain characteristic is intended to secure the operation of the current differential protection during external faults that have very high fault currents. During such external faults, the extremely high fault currents may bring large errors on the measured current values and might also saturate a primary CT, which in turn may cause mal-operation of the differential protection. In order to prevent mal-operation due to the CT saturation, additional logics can be applied to block the differential protection function when the CT saturates during the external faults. Harmonic blocking, internal/external fault discriminator based on negative/zero sequence currents are examples of such function. However, these functions (or methods) cannot always prevent the current differential protection mal-operation.

SUMMARY

One problem is that the direct current (DC) component cannot be properly transformed by the CT and by the protected object, e.g. a power transformer. In this case, the false differential currents appear with very high DC component, as shown in FIG. 2.

FIG. 2 illustrates graphs showing three-phase differential current (upper graph) and DC component (lower graph) during an external fault. An external fault causes very high fault currents: in the figure the total DC component in the currents is shown to be close to 3000 A (y-axis). It is typical that the second harmonic of this false differential current can be temporarily very low and therefore a short unwanted trip command is possible when a harmonic blocking method is utilized.

In view of the above, it is clear that it would be desirable to provide improvements to current differential protection.

It is an objective of the present invention to provide an improved current differential protection method able to properly react to different types of faults, thereby avoiding e.g. mal-operation and unwanted tripping of circuit breakers.

The objective is in an aspect achieved by a method of current differential protection performed in a control device, wherein the control device has a first operate-restrain characteristic with a differential characteristic pick-up setting. The method comprises determining currents of all terminals of a protected object; determining a differential current based on the determined currents; determining direct current components in the respective determined currents; detecting a fault; and adjusting, for a detected external fault, the operate-restrain characteristics by setting an adjusted differential characteristic pick-up setting to be equal to the sum of the differential characteristic pick-up setting and the determined DC components, providing an adjusted operate-restrain characteristics.

The method brings about several advantages and improvements. The method renders the operate-restrain characteristic of differential protection adaptive for different type of faults. Further, the method enables the characteristics to keep a high sensitivity for internal faults. Still further, the characteristic are stable for all external faults, in particular for the case with long time constant DC components in the currents.

The objective is in an aspect achieved by a computer program in a control device for current differential protection. The computer program comprises computer program code, which, when executed on at least one processor on the control device causes the control device to perform the method as above.

The objective is in an aspect achieved by a computer program product comprising a computer program as above and a computer readable means on which the computer program is stored.

The objective is in an aspect achieved by a control device arranged to protect an object of an electrical power system by current differential protection. The control device has a first operate-restrain characteristic with a differential characteristic pick-up setting. The control device is configured to: determine currents of all terminals of a protected object; determine a differential current based on the determined currents; determine direct current, DC, components in the respective determined currents; detect a fault; and adjust, for a detected external fault, the operate-restrain characteristics by setting an adjusted differential characteristic pick-up setting to be equal to the sum of the differential characteristic pick-up setting $I_D$ and the determined DC components, providing an adjusted operate-restrain characteristics.

Further features and advantages of the invention will become clear upon reading the following description and the accompanying drawings.

DETAILED DESCRIPTION

Figure 1:
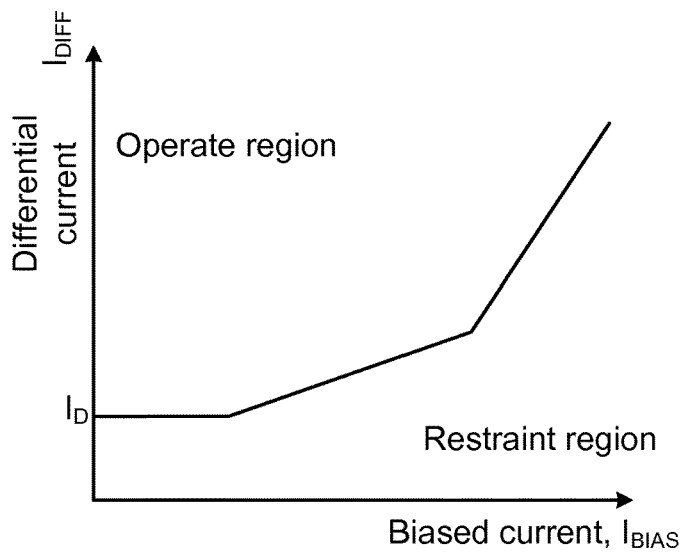
FIG. 1 is a graph showing typical operate-restrained characteristic of current differential protection.
Figure 2:
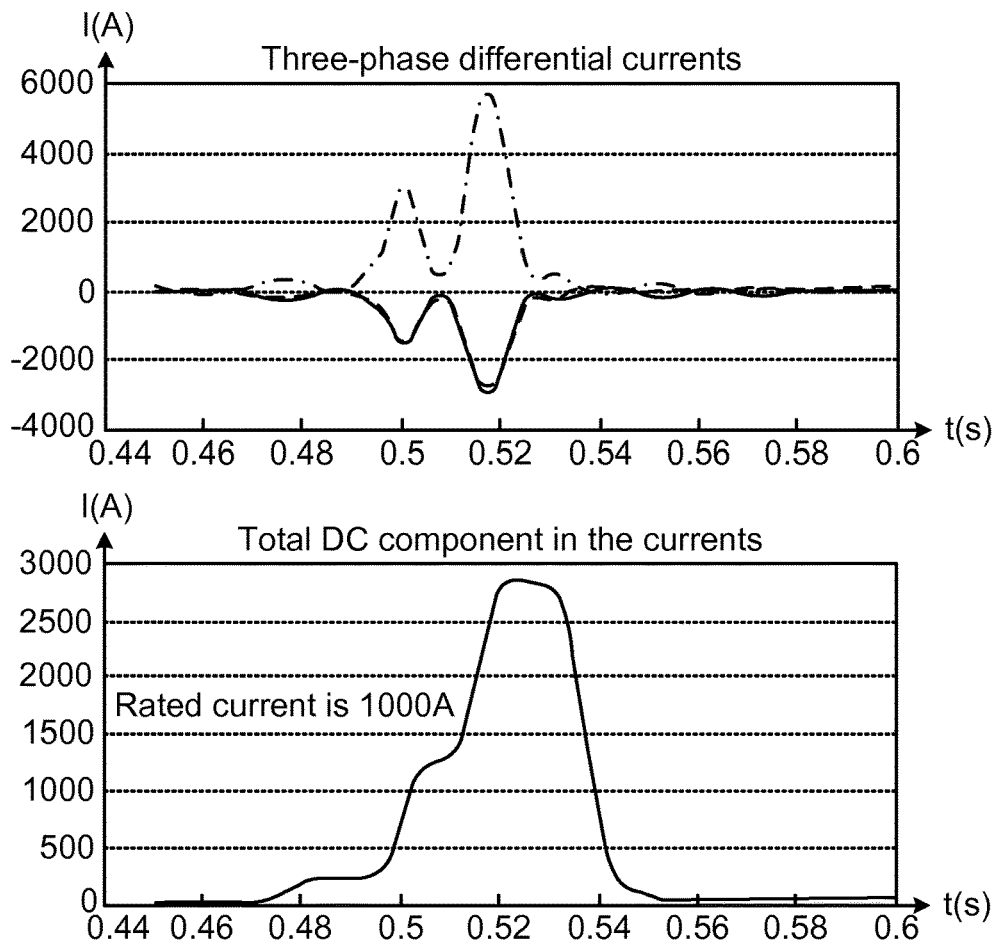
FIG. 2 illustrates graphs showing false differential current and DC component during an external fault.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

Figure 3A:
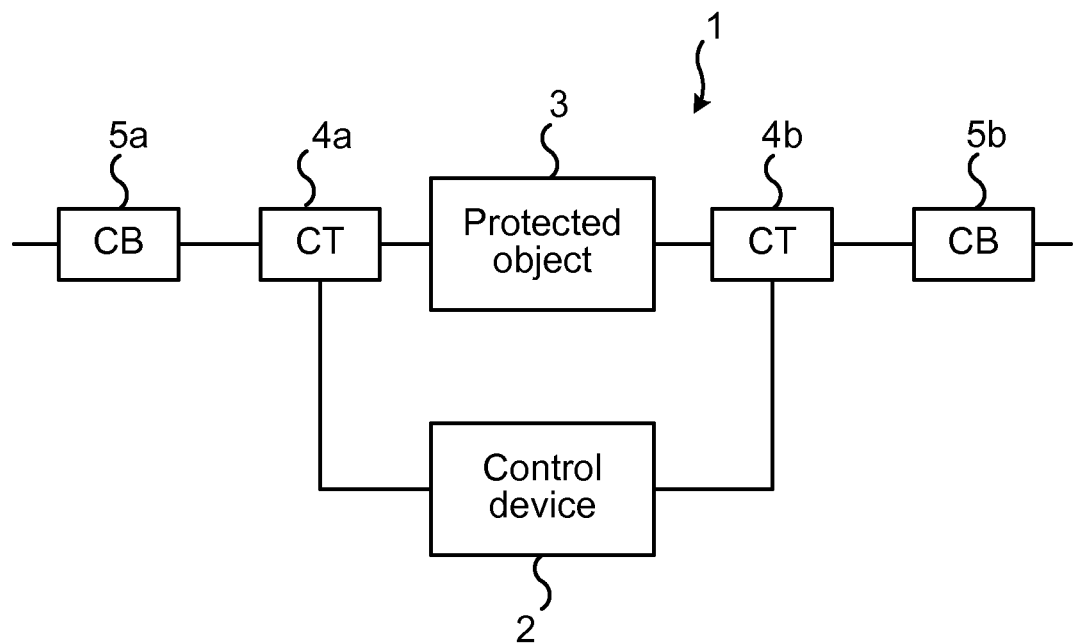
FIGS. 3a and 3b illustrate schematically a power system in which embodiments of the present invention may be implemented.

FIG. 3a illustrates schematically an electrical power system 1 (in the following denoted power system 1) in which embodiments of the present invention may be implemented. An object 3 to be protected is schematically illustrated, and may be e.g. a generator, a power line (or part thereof), power transformer or a busbar etc. The object 3 is protected by a control device 2, which may, for instance, comprise a protective relay or differential relay.

The power system 1 comprises current sensing means, for instance current transformers 4a, 4b, which are arranged on a respective side of the protected object 3, transforming currents down to a level which can be measured. The control device 2 is connected to the protected object 3 via the current transformers 4a, 4b. The current transformers 4a, 4b are arranged to sense the current on a respective side of the object 3. The current transformers 4a, 4b may be arranged to provide a signal that is proportional to the current flowing into and out from the protected object 3, respectively.

The control device 2, e.g. a protective relay, is arrange to sense faults and initiate a disconnection order, also known as initiating a trip command, if detecting any fault. In order to detect faults, the control device 2 receives the signals from the current transformers 4a, 4b, which signals are typically, as mentioned, proportional to the current flowing into and out from the protected object 3.

The power system 1 also comprises a number of circuit breakers 5a, 5b arranged to open or close the power system 1 based on commands received from the control device 2. The power system 1 may comprise further means (not illustrated) conventionally used in power systems. For instance, means for sensing a voltage on the power line may be provided, e.g. a voltage transformer for stepping down the high voltages of the power system 1 into convenient levels for the control device 2 to handle.

Figure 3B:
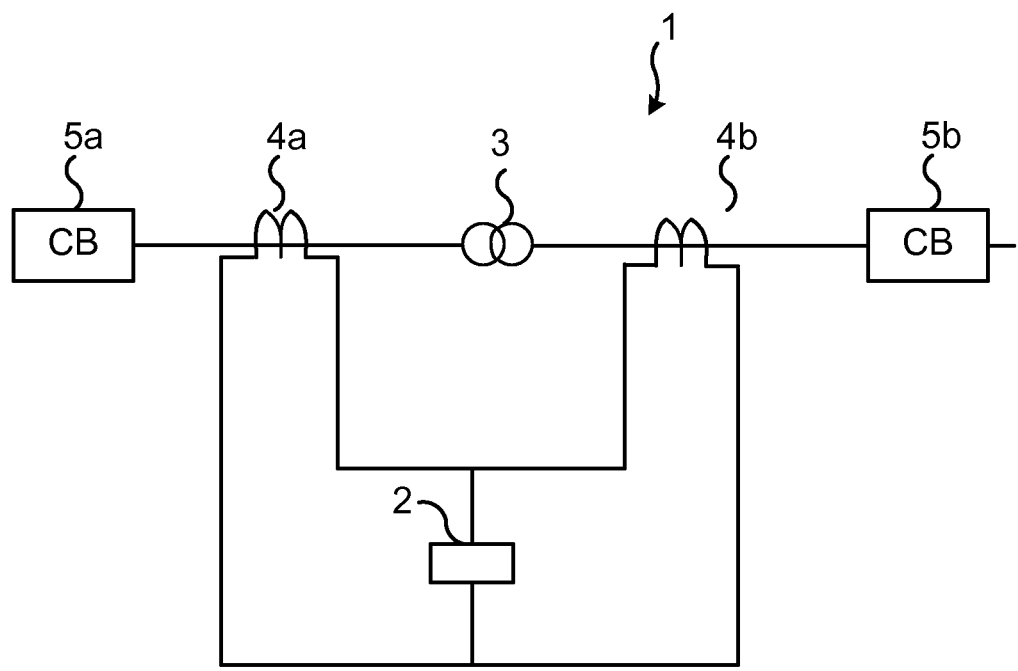

FIG. 3b illustrates, as an example, the case wherein the object 3 to be protected is a power transformer 3 and the control device 2 is a differential relay. The current on the primary (reference) side of the power transformer 3 is compared with the current (referred to the reference side) on the secondary side of the power transformer, wherein the currents are measured by a respective current transformer 4a, 4b (which are shown in a bit more detail in FIG. 3b compared to FIG. 3a). When there is a difference then it is assumed that there is a fault and the circuit breakers 5a, 5b are opened in order to protect the power transformer. Under normal conditions the current on the primary side and the current on the secondary side are equal when using the same reference and opposite such that the resultant current through the differential relay 2 is zero.

It is noted that the two-terminal system of FIGS. 3a, 3b is provided purely as an example, and the invention may be implemented also in multi-terminal systems. In such multi-terminal systems, the control device 2 would form the differential signal by combining the currents at all terminal of the protected device 3.

The control device 2 may further comprise control circuitry for determining whether a fault is internal or external, and issue commands to the circuit breakers 5a, 5b accordingly.

Details on the current transformers 4a, 4b as such or other current sensing means, as well as on circuit breakers are omitted herein so as to not obscure the description, and it is noted that existing current transformers and circuit breakers may be used.

In order to properly react to different types of faults, the invention provides an adaptive current differential protection method. The method eliminates the impact of DC components in currents having long time constant during faults. The method is advantageous e.g. for transformer differential protection (as described in relation to FIG. 3b).

The adaptive current differential protection method may automatically adjust the operate-restrain characteristics during external faults that have long time constant DC component. When the external fault is detected, the method may start a process of monitoring the DC component and adjust the operate-restrain characteristic for the possible CT saturation condition caused by the DC component in the currents.

Figure 4:
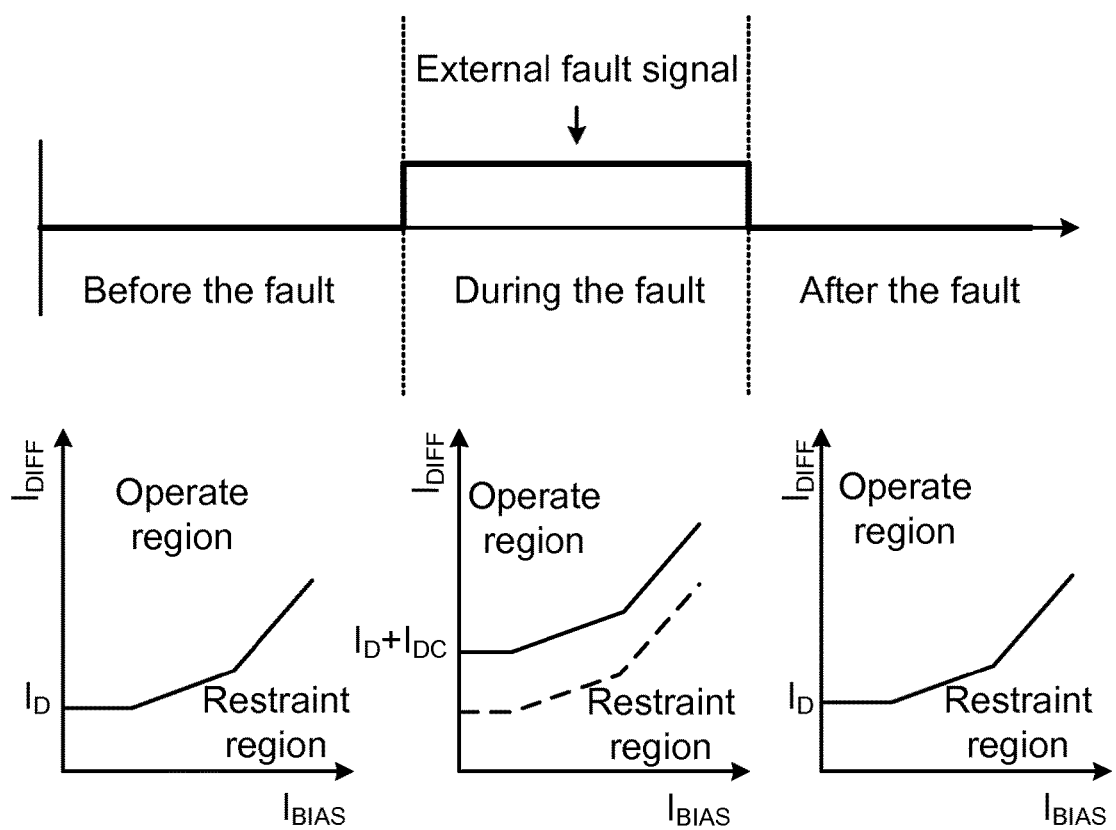
FIG. 4 shows typical operate characteristics of adaptive current differential protection.

FIG. 4 shows simplified operate-restraint characteristics of the adaptive current differential protection according to the invention. $I_D$ is the differential characteristic pick-up setting of the operate-restrained characteristic and $I_{DC}$ is the calculated DC component value in the differential current, which corresponds to the fault current.

Assuming, for instance, that the currents measured by the current differential protection in a two-terminal system are $I_L$ and $I_R$. The DC components $I_{L\_DC}$ and $I_{R\_DC}$ in these currents $I_L$, $I_R$ are measured. The DC component $I_{DC}$ is determined according to:

$$I_{DC} = \begin{cases} I_{L\_DC} + I_{R\_DC} & \text{when external fault is detected} \\ 0 & \text{otherwise} \end{cases} \quad \text{(Equation 1)}$$

In an algorithm according to the invention, $I_{DC}$ is the DC components from all terminals (two in this example) and is added to the initial differential characteristic pick-up setting $I_D$ when an external fault is detected. The operate-restrained characteristic hence decreases the sensitivity for external faults and keeps the original sensitivity for internal fault.

With reference still to FIG. 4, the graphs illustrate how the differential characteristic pick-up setting $I_D$ (lowermost graphs) is adapted between the cases of: before a fault is detected, when an external fault is detected ($I_D$ is adapted to $I_D+I_{DC}$) and after the fault. Before the fault detection, the differential characteristic pick-up setting $I_D$ is according to initial settings (see lower and leftmost graph), i.e. according to a specific characteristics given by the manufacturer of the protection device implementing the method. When the external fault is detected the operate-restrained characteristic is changed (see middlemost lower graph) according to the above equation. In particular, the differential characteristic pick-up sensitivity is lowered by increasing the operate level. Finally, after the fault, the operate-restrained characteristic is back to have its normal differential characteristic pick-up setting $I_D$.

By using the adaptive solution, the current differential protection eliminates the impact of CT saturation caused by DC component and keeps a stable operation during the external fault.

Process steps of the method may be summarized by:
1. For any current differential protection, determine the currents of all terminals. This may be done e.g. by measuring, by calculating or by obtaining (e.g. receiving or inquiring) the values from the CTs 4a, 4b. As an example, this gives instantaneous current values $i_1$, $i_2$, . . . , $i_n$.
2. Determine, e.g. calculate, the restrain current and operate value according to the operate-restraint characteristic of the current differential protection. This may be done in different ways, and can differ depending e.g. on the object to be protected. As an example, the restrain current may, for instance, be determined as $$I_{bias}=k(|i_1|+|i_2|+ \ldots +|i_n|),$$

where k is a constant.
3. Determine, e.g. calculate, the differential currents. The differential currents may also be determined in different ways, but is typically based on a combination of the currents at all the terminals, for instance $I_{diff}=(i_1+i_2+ \ldots +i_n)$.
4. Determine the fault type (internal fault or external fault) based on the above determined differential currents. This determination may for instance be based on sequence components (negative or zero sequence currents) or incremental components (pure fault currents) or some other method.
5. Determine the DC components in the instantaneous currents determined in step 1.
6. The differential characteristic pick-up setting $I_D$ is adjusted according to: $I_D$ is equal to the original $I_D$ ($I_D=I_D+0$) if there is an internal fault, and $I_D$ is equal to the sum of the original $I_D$-value and the DC components ($I_D=I_D+I_{DC}$) if there is an external fault.
7. Compare the results from step 3 and step 6. If the differential current is higher than the operate value, a fault is detected and a trip signal is issued. Otherwise, the current differential protection remains stable.

Figure 5:
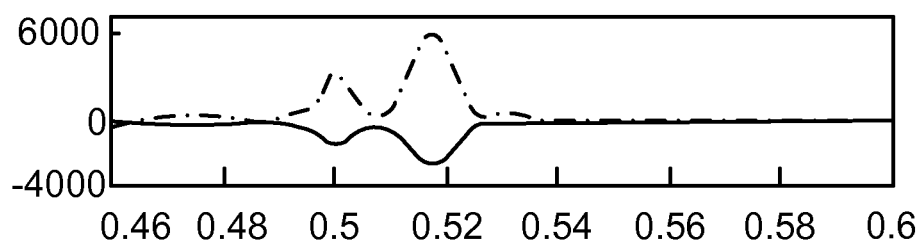
FIG. 5 shows test result of a known transformer differential protection.
Figure 5:
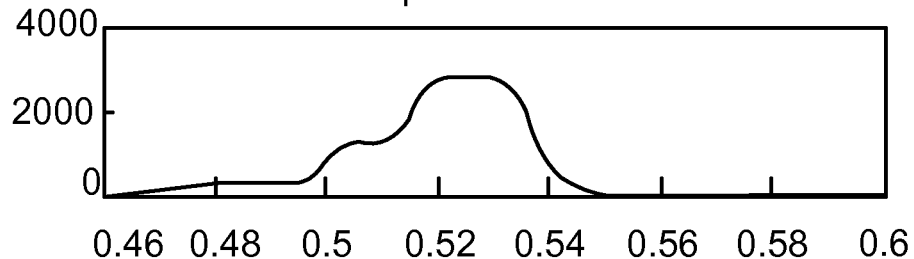
Figure 5:
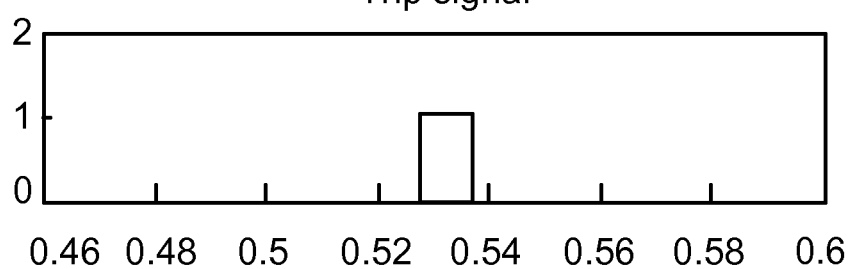

FIG. 5 shows test result of a known transformer differential protection for an external fault. The uppermost graph shows instantaneous differential currents, the graph below it shows the total DC components in these currents. The classical differential protection mal-operates due to a false differential current, as shown by the test results in FIG. 5. This results in the known differential protection issuing an unwanted tripping of the circuit breakers when the false differential current exceed the operate value.

Figure 6:
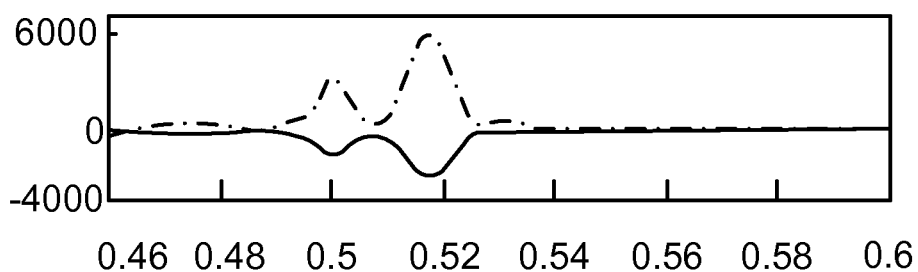
FIG. 6 shows test result of adaptive current differential protection according to the present invention.
Figure 6:
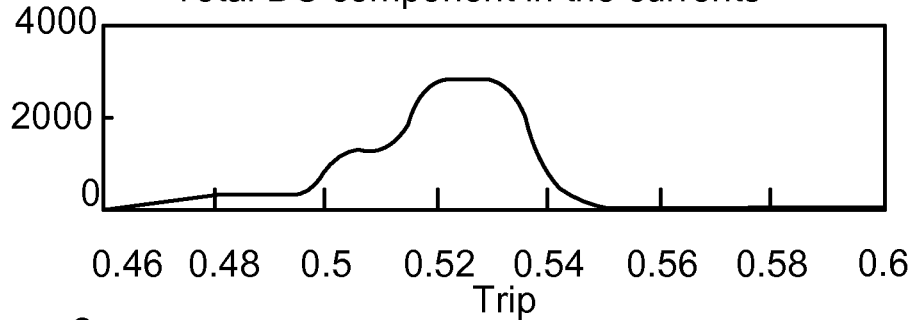
Figure 6:
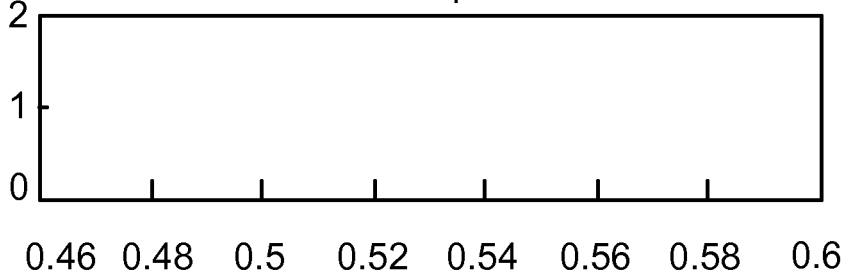

FIG. 6 shows test result of adaptive current differential protection according to the present invention. The test results are shown for an external fault in a manner corresponding to the test results shown in FIG. 5 for the known differential protection. In contrast to the known method (FIG. 5), the unwanted tripping of the circuit breakers is avoided by means of the invention. The simulation results show that the adaptive differential protection remains stable during external faults with high DC components when using the method according to the invention. The operate-restrain characteristics is desensitized and the DC component is added to the operate value when the external fault is detected. There are no trip signals issued by the differential protection, whereby the method provides an improvement compared to the known differential protection.

The features and embodiments that have been described may be combined in different ways, examples of which are given in the following.

Figure 7:
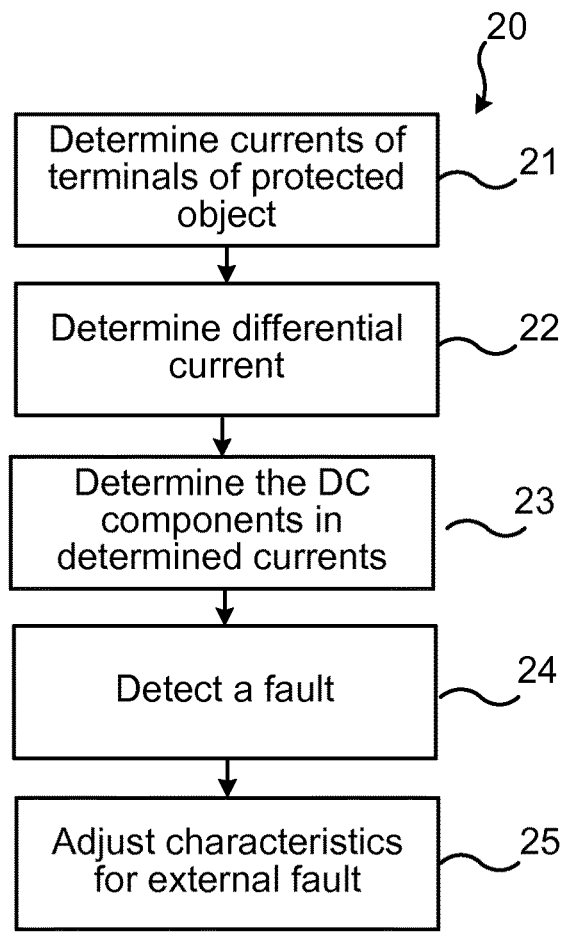
FIG. 7 illustrates a flow chart over steps of a method in a controller in accordance with the present invention.

FIG. 7 illustrates a flow chart over steps of a method in a controller in accordance with the present invention.

A method 20 of current differential protection is provided. The method 20 may be performed in a control device 2 having a first operate-restrain characteristic with a differential characteristic pick-up setting $I_D$. This differential characteristic pick-up setting $I_D$ may be specific for the protection device at hand, depending e.g. on implementation, and may have been set by manufacturer thereof. The first operate-restrain characteristics with a differential characteristic pick-up setting $I_D$ may, for instance, comprise the graph shown in bottommost left-hand graph of FIG. 4.

The method 20 comprises determining 21 currents of all terminals of a protected object 3. The currents to and from the protected object 3 may be measured by current transformers 4a, 4b and measurement signals may be provided to the control device 2. It is noted that depending on the protected object 3, some pre-processing of the signals may be needed. For instance, if the protected object 3 comprises a three-phase transformer, then angular displacements between primary and secondary currents may be introduced depending on type of winding connections, and such angular displacements may need to be adjusted for by signal pre-processing before any comparison.

The method 20 comprises determining 22 a differential current based on the determined currents. The determining 22 of the differential current may comprise calculating the differences between the determined currents of the terminals as a combination, e.g. linear combination, of the current at all the terminals. The differential current is (ideally) zero under load and equals the fault current during internal faults.

The method 20 comprises determining 23 direct current, DC, components, denoted $I_{DC}$, in the respective determined currents.

The method 20 comprises detecting 24 a fault. This detecting 24 may be performed in any known manner, for instance (and as has been mentioned earlier), a negative sequence current may be used or a zero sequence method or an incremental current method.

The method 20 comprises adjusting 25, for a detected external fault, the operate-restrain characteristics by setting an adjusted differential characteristic pick-up setting $I_{D\_adj}$ to be equal to the sum of the differential characteristic pick-up setting $I_D$ and the determined current $I_{DC}$ of the DC components, providing an adapted operate-restrain characteristic. The adapted operate-restrain characteristic with the adjusted differential characteristic pick-up setting $I_{D\_adj}$ may, for instance, comprise the graph shown in bottommost middle graph of FIG. 4. The adjusted differential characteristic pick-up setting $I_{D\_adj}$ is then equal to $I_D+I_{DC}$.

The method 20 provides various advantages. The operate-restrain characteristics of the differential protection become adaptive to different types of faults, in particular external faults versus internal faults. For internal faults, the operate-restrain characteristics keep a high sensitivity, while the sensitivity ($I_D$) is decreased for external faults. The operate-restrain characteristics are stable for all external faults, and especially the case with long time constant DC components in the currents.

In an embodiment, the method 20 comprises issuing a trip signal for opening one or more circuit breakers 5a, 5b when the determined differential current is within the operating area of the adapted operate-restrain characteristics.

In an embodiment, the method comprises, for an internal detected fault, issuing a trip signal for opening one or more circuit breakers 5a, 5b when the determined differential current is within the operate area to the first operate-restrain characteristics.

In an embodiment, the object 3 comprises a transformer. The method 20 is particularly suitable for protection of e.g. a transformer, and when the protected object is close to generators where the time constant is long, e.g. more than 100 ms.

In different embodiments, the detecting 24 the fault comprises using a negative sequence current method, a zero sequence current method or an incremental current method.

Figure 8:
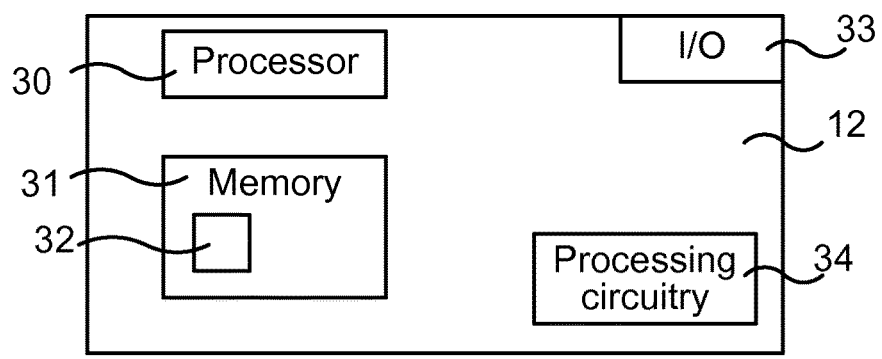
FIG. 8 illustrates schematically a control device and means for implementing embodiments of the present invention.

FIG. 8 illustrates schematically a control device and means for implementing embodiments of the present invention. The control device 2 comprises a processor 30 comprising any combination of one or more of a central processing unit (CPU), multiprocessor, microcontroller, digital signal processor (DSP), application specific integrated circuit etc. capable of executing software instructions (e.g. computer program 32) stored in a memory 31 which can thus be a computer program product. The processor 30 can be configured to execute any of the various embodiments of the method 20 for instance as described in relation to FIG. 7.

The memory 31 can be any combination of read and write memory (RAM) and read only memory (ROM), Flash memory, magnetic tape, Compact Disc (CD)-ROM, digital versatile disc (DVD), Blu-ray disc etc. The memory 31 may also comprise persistent storage, which, for example, can be any single one or combination of magnetic memory, optical memory, solid state memory or even remotely mounted memory.

The control device 2 comprises an input/output device 33 (denoted I/O in the figure) for communication with other devices. The input/output device 33 may for instance comprise an interface, protocol stacks etc., for receiving signals from the CTs 4a, 4b and sending signals to the CBs 5a, 5b. The control device 2 may comprise other interfaces as well, e.g. enabling an operator to access it remotely.

The control device 2 may comprise additional processing circuitry, schematically indicated at reference numeral 34 for implementing the various embodiments according to the present invention.

A control device 2 is provided that is arranged to protect an object 3 of an electrical power system 1 by current differential protection. For instance, the control device 2 may be arranged for such protection function as described with reference to FIGS. 3a and 3b. The control device 2 has a first operate-restrain characteristic with a differential characteristic pick-up setting $I_D$. The control device 2 is configured to:
  determine currents of all terminals of a protected object 3,
  determine a differential current based on the determined currents,
  determine direct current, DC, components $I_{DC}$ in the respective determined currents,
  detect a fault, and
  adjust, for a detected external fault, the operate-restrain characteristics by setting an adjusted differential characteristic pick-up setting $I_{D\_adj}$ to be equal to the sum of the differential characteristic pick-up setting $I_D$ and the determined DC components $I_{DC}$, providing an adapted operate-restrain characteristics.

The control device 2 may be configured to perform the above steps e.g. by comprising one or more processors 30 and memory 31, the memory 31 containing instructions executable by the processor 30, whereby the control device 2 is operative to perform the steps.

In an embodiment, the control device 2 is configured to issue a trip signal for opening one or more circuit breakers 5a, 5b when the determined differential current is within the operating area of the adapted operate-restrain characteristics.

In an embodiment, the control device 2 is configured to, for an internal detected fault, issue a trip signal for opening one or more circuit breakers 5a, 5b when the determined differential current is within the operating area to the first operate-restrain characteristics. That is, for an internal detected fault, the first operate-restrain characteristic is used.

In various embodiments, the object 3 comprises a transformer. The control device 2 is particularly suitable for protecting a transformer, and when the protected object is close to generators where the time constant is long, e.g. more than 100 ms.

In different embodiments, the control device 2 is configured to, detect the fault by using a negative sequence current method, a zero sequence current method or an incremental current method.

The invention has mainly been described herein with reference to a few embodiments. However, as is appreciated by a person skilled in the art, other embodiments than the particular ones disclosed herein are equally possible within the scope of the invention, as defined by the appended patent claims.

The invention claimed is:

1. A methods of current differential protection performed in a control device, the control device having a first operate-restrain characteristic with a differential characteristic pick-up setting $I_D$, the method comprising:
  determining currents of all terminals of a protected object,
  determining a differential current based on the determined currents,
  determining direct current, DC, components, $I_{DC}$ in the respective determined currents,
  detecting a fault, and determining whether it is an internal or external fault, and
  adjusting, for a detected external fault, the operate-restrain characteristic by setting an adjusted differential characteristic pick-up setting $I_{D\_adj}$ to be equal to the sum of the differential characteristic pick-up setting $I_D$ and the determined DC components, $I_{DC}$, providing an adjusted operate-restrain characteristic.

2. The method as claimed in claim 1, including issuing a trip signal for opening one or more circuit breakers when the determined differential current is within an operate area of the adjusted operate-restrain characteristic.

3. The method as claimed in claim 1, including, for a detected internal fault, issuing a trip signal for opening one or more circuit breakers when the determined differential current is within an operate area of the first operate-restrain characteristic.

4. The method as claimed in claim 1, wherein the object includes a transformer.

5. The method as claimed in claim 1, wherein the detecting the fault includes using a negative sequence current method, a zero sequence current method or an incremental current method.

6. A non-transitory computer readable medium storing a computer program for a control device for current differential protection, the computer program comprising a computer program code, which, when executed on at least one processor on the control device causes the control device to perform a method including:
   determining currents of all terminals of a protected object,
   determining a differential current based on the determined currents,
   determining direct current, DC, components, $I_{DC}$ in the respective determined currents,
   detecting a fault and determining whether it is an internal or external fault, and
   adjusting, for a detected external fault, an operate-restrain characteristic having a differential characteristic pickup setting $I_D$ by setting an adjusted differential characteristic pick-up setting $I_{DC\_adj}$ to be equal to the sum of the differential characteristic pick-up setting $I_D$ and the determined DC components, $I_{DC}$, providing an adjusted operate-restrain characteristic.

7. A control device arranged to protect an object of an electrical power system by current differential protection, the control device having a first operate-restrain characteristic with a differential characteristic pick-up setting $I_D$, the control device being configured to:
   determine currents of all terminals of a protected object,
   determine a differential current based on the determined currents,
   determine direct current, DC, components $I_{DC}$ in the respective determined currents,
   detect a fault and determine whether it is an internal or external fault, and
   adjust, for a detected external fault, the operate-restrain characteristic by setting an adjusted differential characteristic pick-up setting $I_{D\_adj}$ to be equal to the sum of the differential characteristic pick-up setting $I_D$ and the determined DC components $I_{DC}$, providing an adjusted operate-restrain characteristic.

8. The control device as claimed in claim 7, configured to issue a trip signal for opening one or more circuit breakers when the determined differential current is within an operate area of the adjusted operate-restrain characteristic.

9. The control device as claimed in claim 7, configured to, for a detected internal fault, issue a trip signal for opening one or more circuit breakers when the determined differential current is within an operate area of the first operate-restrain characteristics.

10. The control device as claimed in claim 7, wherein the object includes a transformer.

11. The control device as claimed in claim 7, configured to detect the fault by using a negative sequence current method, a zero sequence current method or an incremental current method.

12. The method as claimed in claim 2, including, for a detected internal fault, issuing a trip signal for opening one or more circuit breakers when the determined differential current is within an operate area of the first operate-restrain characteristic.

13. The method as claimed in claim 2, wherein the object includes a transformer.

14. The method as claimed in claim 2, wherein the detecting the fault includes using a negative sequence current method, a zero sequence current method or an incremental current method.

15. The control device as claimed in claim 8, configured to, for a detected internal fault, issue a trip signal for opening one or more circuit breakers when the determined differential current is within an operate area of the first operate-restrain characteristic.

16. The control device as claimed in claim 8, wherein the object includes a transformer.

17. The control device as claimed in claim 8, configured to detect the fault by using a negative sequence current method, a zero sequence current method, or an incremental current method.

* * * * *